(12) United States Patent
Hosomizo

(10) Patent No.: US 11,875,074 B2
(45) Date of Patent: Jan. 16, 2024

(54) COMPUTER-READABLE STORAGE MEDIUM AND METHOD FOR DISPLAYING INFORMATION ABOUT WHETHER PRINT SETTINGS ARE CONFIGURABLE

(71) Applicant: Brother Kogyo Kabushiki Kaisha, Nagoya (JP)

(72) Inventor: Yoshito Hosomizo, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/154,056

(22) Filed: Jan. 13, 2023

(65) Prior Publication Data

US 2023/0236781 A1 Jul. 27, 2023

(30) Foreign Application Priority Data

Jan. 25, 2022 (JP) .................................. 2022-009571

(51) Int. Cl.
G06F 3/12 (2006.01)
(52) U.S. Cl.
CPC .......... G06F 3/1255 (2013.01); G06F 3/1208 (2013.01); G06F 3/1228 (2013.01)
(58) Field of Classification Search
CPC ..... G06F 3/1255; G06F 3/1208; G06F 3/1228
USPC ...................................................... 358/1.15
See application file for complete search history.

(56) References Cited

U.S. PATENT DOCUMENTS

| | | | | |
|---|---|---|---|---|
| 10,642,559 | B2* | 5/2020 | Iwamoto | G06F 3/1292 |
| 2006/0103869 | A1* | 5/2006 | Kato | G06F 3/1255 |
| | | | | 358/1.13 |
| 2019/0114126 | A1* | 4/2019 | Suzuki | G06F 3/1285 |
| 2019/0273839 | A1* | 9/2019 | Shiotani | H04N 1/00477 |
| 2020/0089444 | A1 | 3/2020 | Hagiwara et al. | |

(Continued)

FOREIGN PATENT DOCUMENTS

| | | |
|---|---|---|
| JP | 2017-102969 A | 6/2017 |
| JP | 2017-156980 A | 9/2017 |
| JP | 2020-046910 A | 3/2020 |

(Continued)

*Primary Examiner* — Allen H Nguyen
(74) *Attorney, Agent, or Firm* — BURR PATENT LAW, PLLC

(57) ABSTRACT

A non-transitory computer-readable storage medium stores computer-readable instructions that are executable by a processor of an information processing device and compatible with a printer connected with the information processing device. The instructions support a general-purpose printing program incorporated in an operating system of the information processing device. The general-purpose printing program is configured to handle data for displaying a print setting screen on the information processing device. The instructions, when executed by the processor, cause the information processing device to, after print settings are changed via the print setting screen, determine whether the print settings are proper based on capability information of the printer, when determining that the print settings include improper settings, generate first notification data indicating that the print settings are improper, and provide the first notification data to the general-purpose printing program, thereby enabling the first notification data to be displayed on the print setting screen.

9 Claims, 13 Drawing Sheets

(56) References Cited

U.S. PATENT DOCUMENTS

2020/0110564 A1  4/2020  Kanai
2021/0279019 A1* 9/2021  Armstrong ............ G06F 3/1208

FOREIGN PATENT DOCUMENTS

| JP | 2020-059123 A | 4/2020 |
| JP | 2020-095535 A | 6/2020 |

* cited by examiner

| Exclusion No. | Setting | Setting |
| --- | --- | --- |
| 1 | Feed Tray: Tray 2 | Sheet Type: Glossy Paper |
| 2 | Feed Tray: Tray 2 | Sheet Size: Envelope Size |
| 3 | Sheet Size: Envelope Size | Borderless Printing: Execute |
| 4 | Sheet Size: Envelope Size | Duplex Printing: Duplex Printing |
| 5 | Duplex Printing: Duplex Printing | Borderless Printing: Execute |

FIG. 5A

| Exclusion No. | Setting | Setting |
| --- | --- | --- |
| 11 | Poster Printing (1in2x2) | Duplex Printing: Duplex Printing |
| 12 | Intensive Printing (4in1) | Booklet Printing: Execute |
| 13 | Poster Printing (1in2x2) | Sheet Size: Envelope Size |

FIG. 5B

D3 — DETAIL SETTING SCREEN

| | |
|---|---|
| Number of Copies | 1 copies   Print Orientation   Portrait ▽ |
| Print Quality | High Quality ▽ |
| Color Mode | Color ▽ |
| Sheet Size | A4 size ▽ |
| Feed Tray | Automatic Selection ▽ |
| Sheet Type | Plain Paper ▽ |
| Duplex Printing | Simplex Printing ▽ |
| Layout Printing | ● Not Execute  ○ Execute  [Details] |
| Borderless Printing | ● Not Execute  ○ Execute   Margin  Specified Value ▽ |
| Poster Printing | ● Not Execute  ○ Execute  [Details] |
| Booklet Printing | ● Not Execute  ○ Execute  [Details] |
| Stapling | ● Not Execute  ○ Execute  [Details] |

{ 61

( Print )  ( Cancel )  ( Apply ) — SW22

FIG. 7

COMPUTER-READABLE STORAGE MEDIUM AND METHOD FOR DISPLAYING INFORMATION ABOUT WHETHER PRINT SETTINGS ARE CONFIGURABLE

REFERENCE TO RELATED APPLICATIONS

This application claims priority from Japanese Patent Application No. 2022-009571 filed on Jan. 25, 2022. The entire content of the priority application is incorporated herein by reference.

BACKGROUND ART

Heretofore, a technology to display, using a printer driver, information about whether print settings are configurable has been known. For instance, a printer driver has been disclosed that is configured to activate a restriction function to restrict the setting of a particular function and display a screen to show which settings are selectable to execute printing when the restriction function is activated.

DESCRIPTION

In recent years, a technology has been put to practical use in which a printer is controlled using a general-purpose printing program incorporated in an OS ("OS" is abbreviation for "Operating System") as a standard program, without using any printer driver. In this technology, when detecting a printer, the OS associates the printer with the OS-standard general-purpose printing program. Thereafter, in response to receipt of a print instruction for the printer, the OS causes the printer to perform printing, using the OS-standard general-purpose printing program without using any printer driver.

However, such a configuration has not been known, of an information processing device using the OS-standard general-purpose printing program, as to display information about whether print settings are configurable in advance of printing in the same manner as the printer driver. Therefore, there is room for improvement in the display technology under an environment where the OS-standard general-purpose printing programs is used.

Aspects of the present disclosure are advantageous to provide one or more improved techniques that make it possible for an information processing device with an OS-standard general-purpose printing program incorporated to display information about whether print settings are configurable.

According to aspects of the present disclosure, a non-transitory computer-readable storage medium is provided, which stores computer-readable instructions that are executable by a processor of an information processing device and compatible with a printer connected with the information processing device. The instructions support a general-purpose printing program incorporated in advance in an operating system of the information processing device. The instructions are configured to, when executed by the processor, cause the information processing device to perform obtaining capability information indicating capabilities of the printer. The instructions are further configured to, when executed by the processor, cause the information processing device to perform, in response to a request from the general-purpose printing program after print settings are changed via a print setting screen displayed on a display of the information processing device, obtaining the changed print settings, and determining whether the obtained print settings are proper based on the obtained capability information. The general-purpose printing program is configured to handle data for displaying the print setting screen on the display. The instructions are further configured to, when executed by the processor, cause the information processing device to perform, in response to determining that the obtained print settings include improper settings, generating first notification data indicating that the print settings are improper, and providing the generated first notification data to the general-purpose printing program, thereby enabling the first notification data to be displayed on the print setting screen.

According to aspects of the present disclosure, further provided is a method implementable on a processor of an information processing device that executes a support program supporting a general-purpose printing program incorporated in advance in an operating system of the information processing device. The support program is compatible with a printer connected with the information processing device. The method includes obtaining capability information indicating capabilities of the printer. The method further includes, in response to a request from the general-purpose printing program after print settings are changed via a print setting screen displayed on a display of the information processing device, obtaining the changed print settings, and determining whether the obtained print settings are proper based on the obtained capability information. The general-purpose printing program is configured to handle data for displaying the print setting screen on the display. The method further includes, in response to determining that the obtained print settings include improper settings, generating first notification data indicating that the print settings are improper, and providing the generated first notification data to the general-purpose printing program, thereby enabling the first notification data to be displayed on the print setting screen.

FIGS. 5A and 5B show examples of improper combinations of print settings.

FIG. 7 shows an example of a detail setting screen.

Figure 10A:
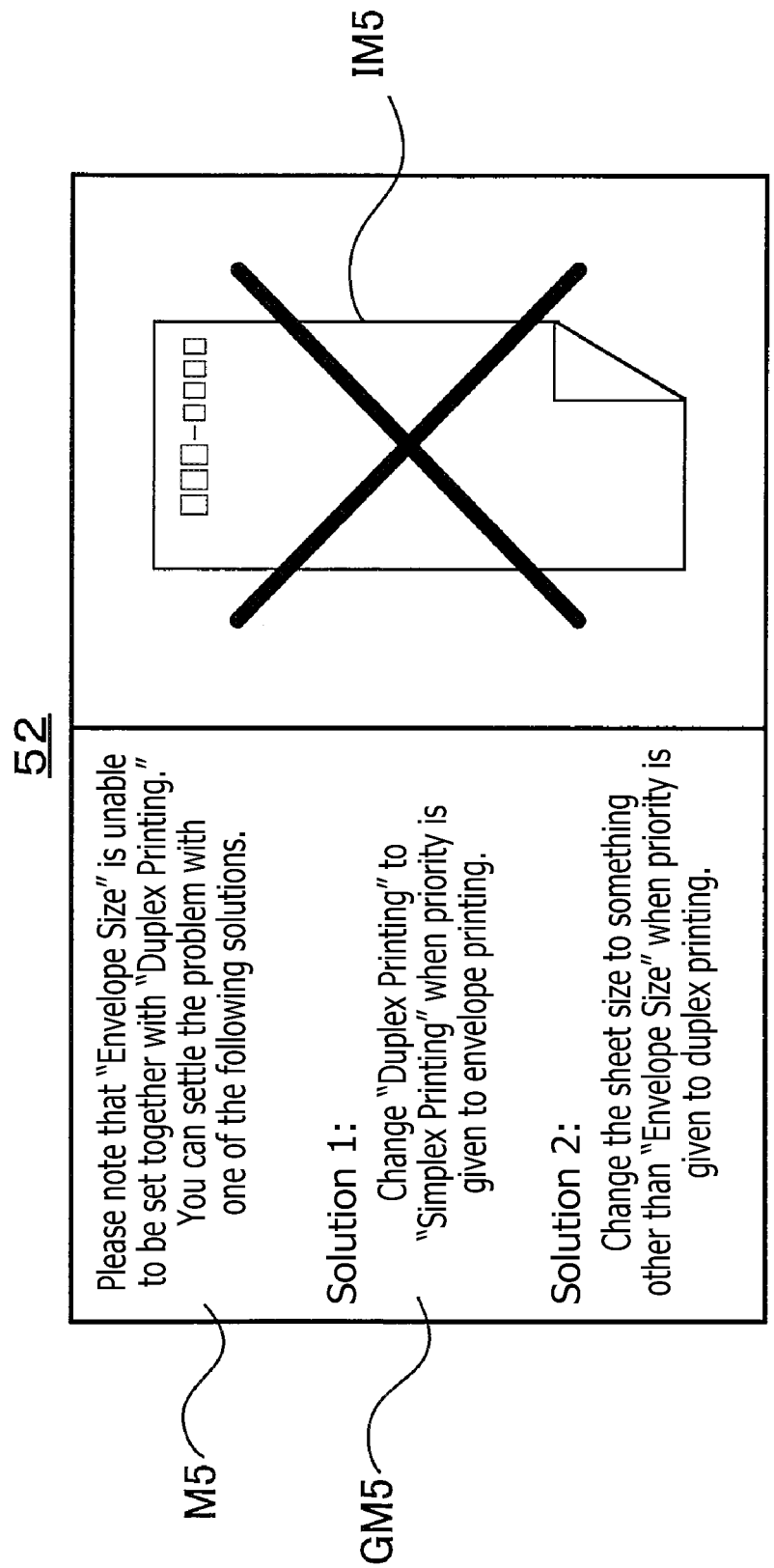
Figure 10B:
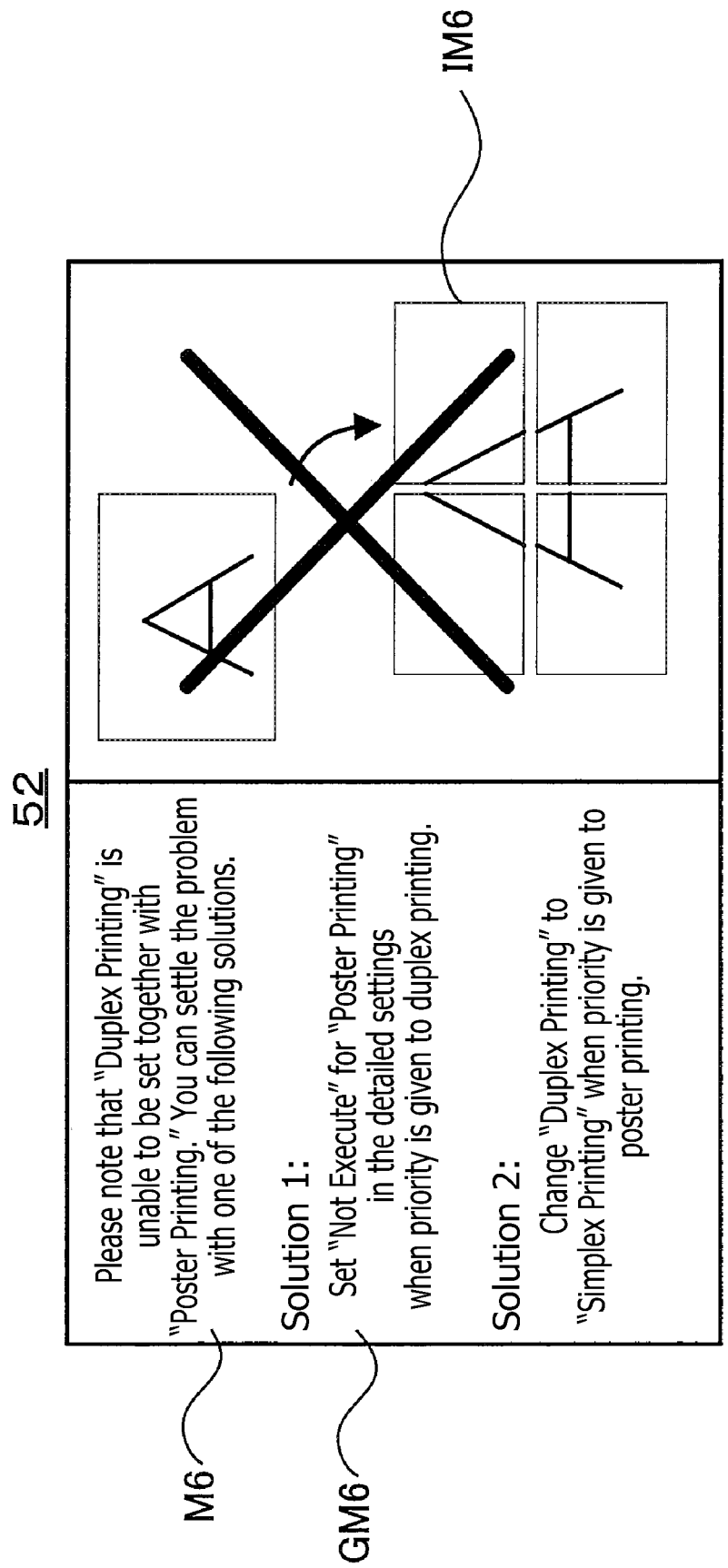
Figure 10C:
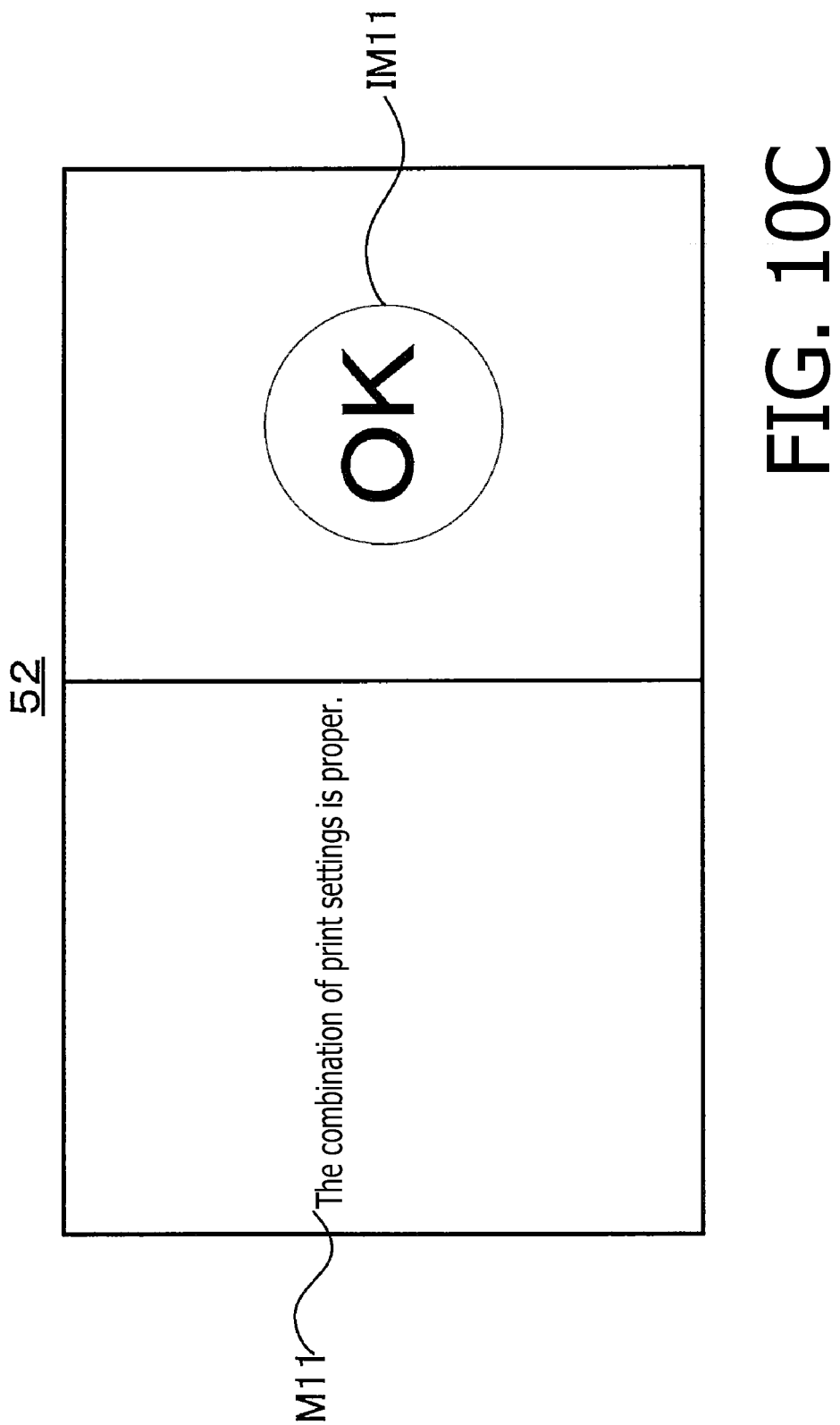

FIGS. 10A, 10B, and 10C show examples of notification data displayed.

Figure 11:
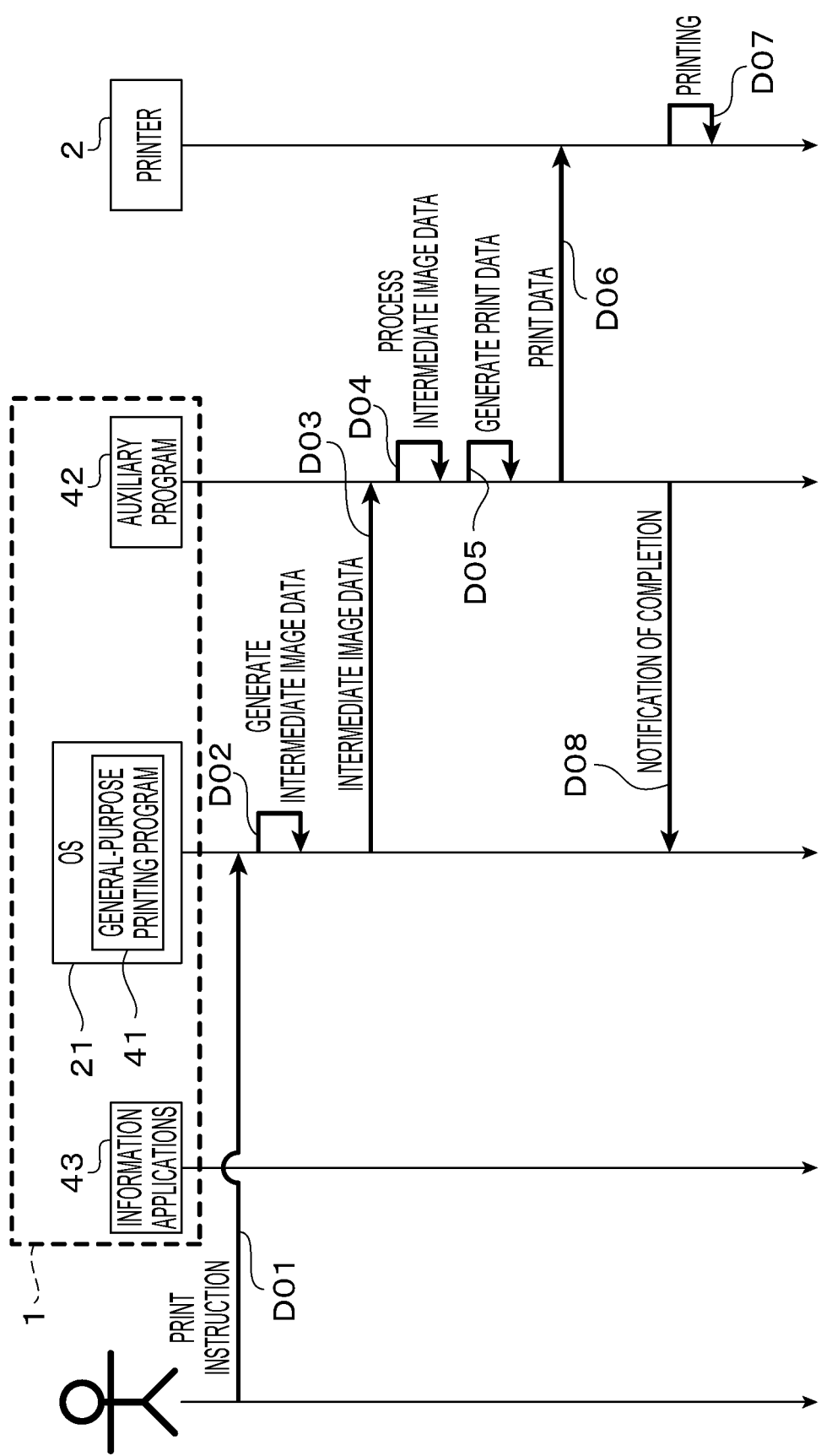

FIG. 11 is a sequence chart showing an example procedure of processes to be performed in response to receipt of a print instruction.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, a personal computer (hereinafter referred to as a "PC") using a support program of an illustrative embodiment according to aspects of the present disclosure will be described with reference to the accompanying drawings.

Figure 1:
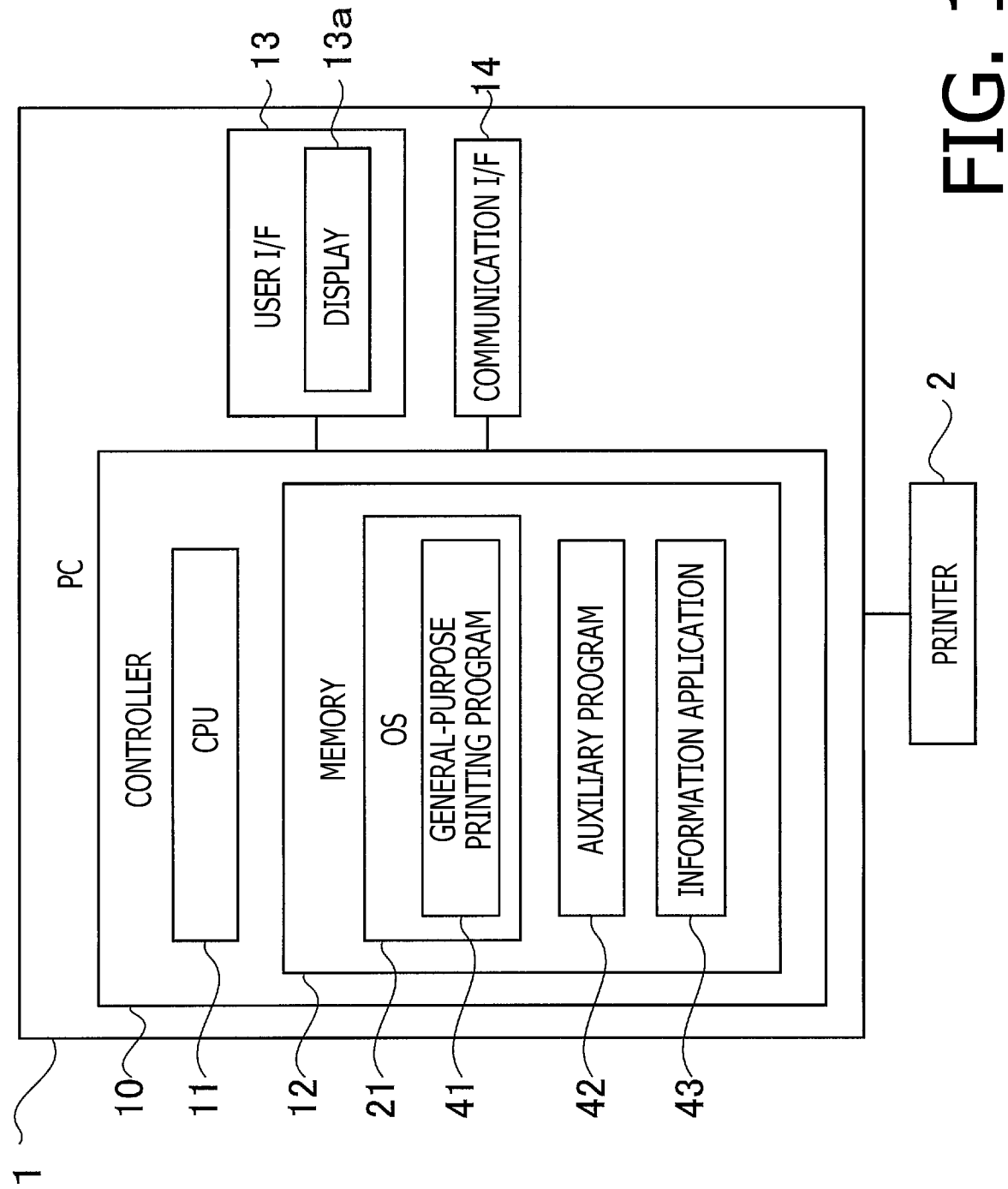
FIG. 1 is a block diagram showing an electrical configuration of a PC.

As shown in FIG. 1, a PC 1 of the illustrative embodiment has a controller 10 that includes a CPU 11 and a memory 12. Further, the PC 1 includes a user interface (hereinafter referred to as a "user I/F") 13 and a communication interface (hereinafter referred to as a "communication I/F") 14, which are electrically connected with the controller 10. It is noted that the "controller 10" shown in FIG. 1 is a generic term as which hardware and software used to control the PC 1 are collectively referred to, and may not necessarily represent a single piece of hardware that actually exists in the PC 1.

The CPU 11 is configured to perform various processes according to programs read from the memory 12 and based on user operations. The memory 12 stores various programs and various types of data. Further, the memory 12 is used as a work area when the CPU 11 performs various processes. A buffer provided to the CPU 11 may be included in examples of the memory 12. The examples of the memory 12 may include, but are not limited to, storage media (e.g., CD-ROMs and DVD-ROMs) that are readable and writable by the CPU 11, as well as a ROM, a RAM, and an HDD incorporated into the PC 1.

The user I/F 13 includes hardware to display a screen for providing information to the user and hardware for accepting user operations. The user I/F 13 may include a display 13a configured to display information, and at least one of input receiving devices (e.g., a mouse, a keyboard, and a touch panel) configured to receive user inputs. For instance, the user I/F 13 may be a combination of the display 13a, the mouse, and the keyboard. In another instance, the user I/F 13 may be a combination of the display 13a and the touch panel.

The communication I/F 14 includes hardware for communication with external devices such as a printer 2. Examples of the communication standards for the communication I/F 14 may include, but are not limited to, Ethernet ("Ethernet" is a registered trademark of Fuji Xerox Co., Ltd.), Wi-Fi ("Wi-Fi" is a registered trademark of the non-profit Wi-Fi Alliance), and USB. The PC 1 may be connectable with the Internet via the communication I/F 14. The PC 1 may include a plurality of communication I/Fs 14 corresponding to a plurality of communication standards.

As shown in FIG. 1, the memory 12 of the PC 1 stores an operating system (hereinafter referred to as an "OS") 21 containing a general-purpose printing program 41, and further stores an auxiliary program 42 and various application programs (hereinafter referred to as "applications"). Examples of the OS 21 may include, but are not limited to, Windows ("Windows" is a registered trademark of Microsoft Corporation), macOS ("macOS" is a registered trademark of Apple Inc.), Linux ("Linux" is a registered trademark of Linus Torvalds), iOS ("iOS" is a registered trademark of Cisco Systems, Inc.), and Android ("Android" is a registered trademark of Google LLC).

The PC 1 of the illustrative embodiment has various applications such as information applications 43 incorporated. For instance, the information applications 43 include a map application, a calendar application, and a browser. The information applications 43 are configured to, when executed by the CPU 11, cause the display 13a to show various types of information in response to user requests. The information applications 43 may not necessarily be configured to cause the information, which the information applications 43 have caused the display 13a to show, to be printed. It is noted that in the following description, "a program, when executed by the CPU 11, causes the PC 1 to perform a specific process" may be simply expressed as "a program performs a specific process" for the sake of explanatory convenience.

The general-purpose printing program 41 is an OS standard program provided with the OS 21. The general-purpose printing program 41 is configured to cause a printer (e.g., the printer 2) to print information displayed on the display 13a by the information applications 43. The general-purpose printing program 41 of the illustrative embodiment includes a function to generate intermediate image data based on image data to be printed. The general-purpose printing program 41 supports functions that are usable in common by a plurality of models of printers provided by various printer vendors. Unlike printer drivers specific to various printers, the general-purpose printing program 41 supports not all of the functions various printers individually have, but supports only general-purpose functions.

The auxiliary program 42 is a program or a group of programs configured to perform processing based on instructions from the OS 1, accompanying the processing by the general-purpose printing program 41. The auxiliary program 42 is for supporting control of the target hardware. The auxiliary program 42 of the illustrative embodiment conforms to the model of the printer 2 connected with the PC1. For instance, the auxiliary program 42 is invoked from the general-purpose printing program 41 in response to receipt of an instruction to cause the printer 2 to perform printing with the general-purpose printing program 41. The auxiliary program 42 is called, for instance, PSA ("PSA" is an abbreviation for "Print Support Application") or HSA ("HSA" is an abbreviation for "Hardware Support Application").

The auxiliary program 42 may be a combination of a plurality of programs each of which is configured to accept an execution instruction, or may be a single program configured to perform respective different processes according to instructions. The auxiliary program 42 may be a program prepared for each type of printers by the printer vendor. For instance, respective auxiliary programs may be prepared for inkjet printers and for laser printers. Further, an auxiliary program may be prepared not only for each type of printers but also for each model of printers or for each series of an individual model of printers.

For instance, when a new printer is connected with the PC 1, according to the type and/or the model of the connected printer, the OS 21 of the PC 1 may download an appropriate auxiliary program from a server and incorporate the downloaded auxiliary program into the PC 1. The OS 21 stores into the memory 12 identification information of the incorporated auxiliary program in association with printer information of the newly connected printer.

As shown in FIG. 1, the PC 1 of the illustrative embodiment is connected with the printer 2. The printer 2 has at least a printing function and a communication function. The printer 2 is configured to receive print data and print settings from an external device such as the PC 1 and perform printing according to the print settings. Examples of setting items for the print settings may include, but are not limited to, the number of copies, a print orientation, a feed tray, a sheet size, a sheet type, duplex printing, color printing, and borderless printing.

Further, examples of the setting items for the print settings may include processing options for processing a target image to be printed, as well as the aforementioned setting items. Examples of the processing options may include, but are not limited to, intensive printing, division printing, and scaling printing. The intensive printing is a printing method in which N (N is a natural number equal to or more than two) pages of images are reduced in size and placed on a single sheet. Examples of the intensive printing may include, but are not limited to, layout printing (Nin1) and booklet printing. In the layout printing, images for a plurality of pages of an original document are arranged in page order on a single sheet. In the booklet printing, images for a plurality of pages of an original document are rearranged and printed on a first side and a second side of a sheet in such a manner that the plurality of pages of the original document are placed in page order when the sheet is folded like a booklet. The division printing is a printing method in which images for one page are divided into M (M is a natural number equal to or more than two) sheets of image(s). Examples of the division printing may include, but are not limited to, poster printing in which sheets are printed with margins for pasting the printed sheets together. The scaling printing is a printing method in which images for one page are enlarged or reduced to a specified magnification.

The printer 2 is enabled to accept the print settings based on its functions. Further, the printer 2 is configured to accept settings for the processing options for which the printer 2 is enabled to perform image processing such as the layout printing (Nin1). The processing options may be realized as well by image processing by the auxiliary program 42. The printer 2 does not accept settings for processing options for which the printer 2 is unable to perform image processing and for which the auxiliary program 42 performs image processing. For instance, if the auxiliary program 42 performs reduction and rearrangement of images, the printer 2 will not accept the settings for the intensive printing. Namely, the printer 2 stores parameters for each configurable setting item, depending on the capabilities of the printer 2. The printer 2 stores information that indicates proper combinations of configurable print settings for the printer 2.

The auxiliary program 42 is configured to cause the printer 2 to display a dedicated print setting screen (hereinafter referred to as a "detail setting screen"). In addition to the setting items which the printer 2 is enabled to accept the settings for, the auxiliary program 42 is further configured to display on the detail setting screen the setting items, for which, as described above, the printer 2 is unable to perform image processing and the auxiliary program 42 performs image processing, and receive settings for the setting items as displayed.

The auxiliary program 42 determines whether each of the combinations of print settings is proper based on the capabilities of the printer 2. Then, the auxiliary program 42 restricts the PC 1 from providing a print instruction based on an improper combination of print settings. Suppose for instance that the printer 2 is unable to feed envelopes from a tray 2. In this case, the auxiliary program 42 restricts the PC 1 from accepting, via the detail setting screen, "Envelope Size" as a setting value for a setting item "Sheet Size" when a setting value "Tray 2" is set for a setting item "Feed Tray."

The general-purpose printing program 41 accepts print settings for its supported functions via a print setting screen. The general-purpose printing program 41 conforms to a plurality of types of printers. Therefore, the general-purpose printing program 41 does not restrict the PC 1 from accepting improper combinations of print settings as the auxiliary program 42 does. For instance, when the printer 2, which is unable to feed envelopes from the tray 2, is selected, and the setting value "Tray 2" is set for the setting item "Feed Tray," the general-purpose printing program 41 allows the PC 1 to receive "Envelope Size" as a setting value for the setting item "Sheet Size."

Figure 2:
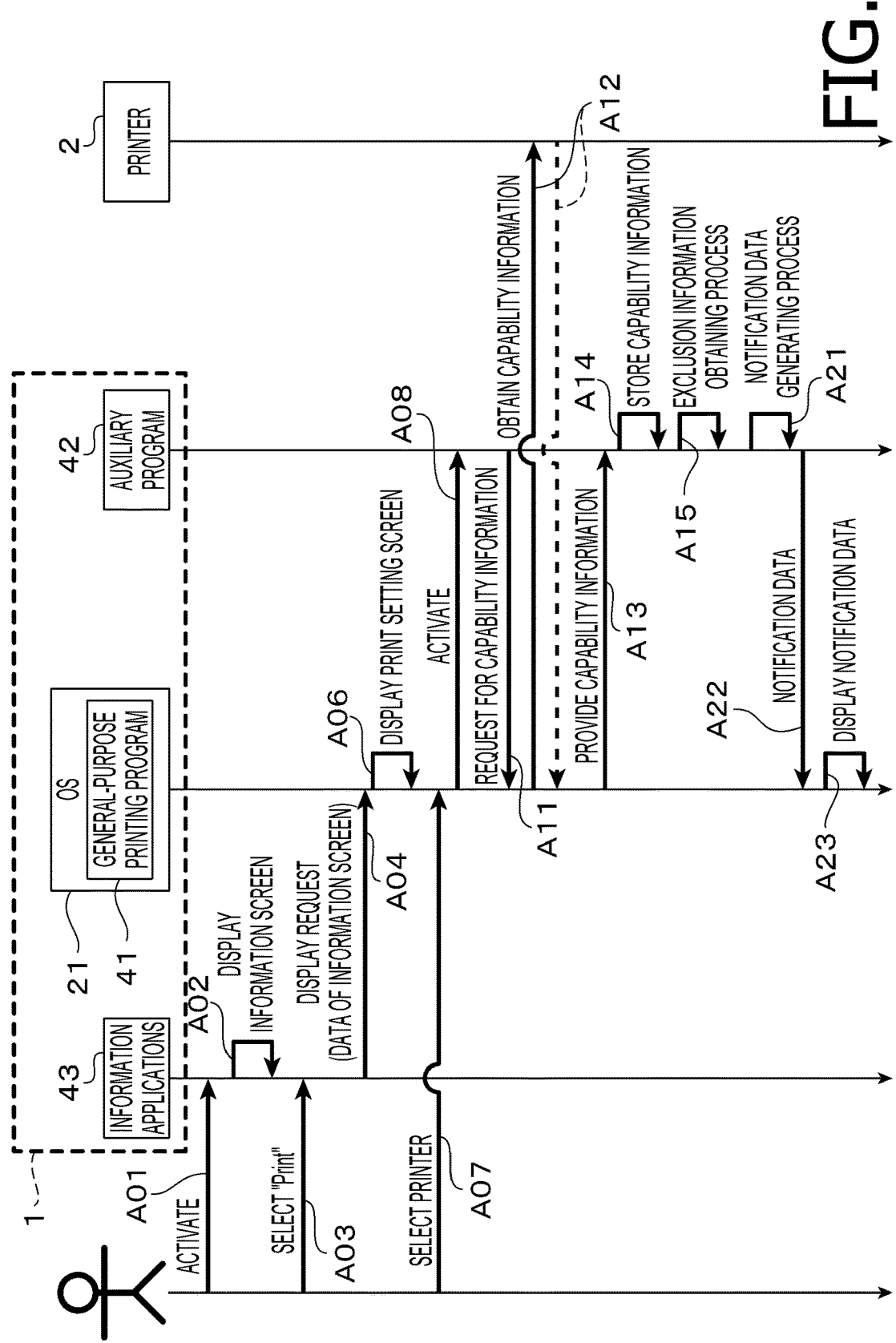
FIG. 2 is a sequence chart showing an example procedure of processes to be performed when "Print" is selected.

Next, referring to a sequence chart shown in FIG. 2, an explanation will be provided of a procedure (i.e., a procedure of printing including the operations by the auxiliary program 42 in the illustrative embodiment) of processes by the individual programs when "Print" is selected via the information applications 43. It is noted that FIG. 2 and after-mentioned other sequence charts indicate operations to be performed when the auxiliary program 42 compatible with the printer 2 is incorporated in the PC 1.

Each processing step in the processes and flowcharts in the illustrative embodiment basically represents a process by the CPU 11 according to instructions described in the programs such as the auxiliary program 42. Processes by the CPU 11 include hardware control using an API ("API" is an abbreviation for "Application Programing Interface") of the OS 21. The following description provides an explanation of operations by each program with a detailed description of the OS 21 omitted. Moreover, "acquisition" and "obtainment" may be used as concepts not requiring any requests.

Figure 3:
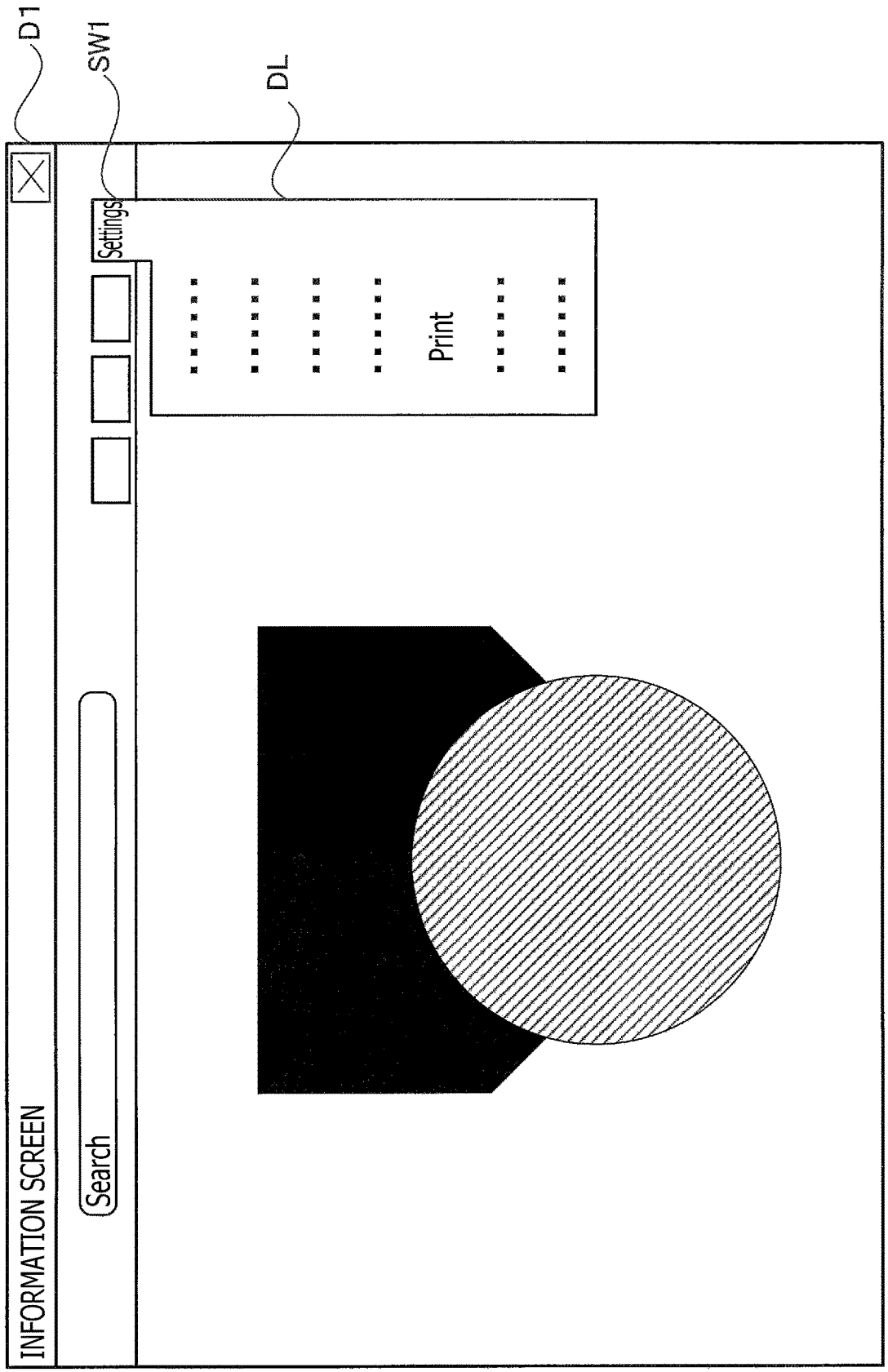
FIG. 3 shows an example of an information screen.

At the beginning of the procedure, the user activates the information applications 43 (A01). The information applications 43 cause the display 13a to display an information screen containing various types of information in response to a user instruction (A02). When the user wishes to print out an image on the information screen, the user selects "Print" on the information screen (A03). For instance, as shown in FIG. 3, an information screen D1 includes a setting button SW1. When the setting button SW1 is pressed by the user, a pull-down menu DL including "Print" is displayed, as shown in FIG. 3. When "Print" in the pull-down menu DL is selected by the user, the information applications 43 sends a display request for the print setting screen and data of the information screen to the general-purpose printing program 41 of the OS 21 (A04).

Figure 4:
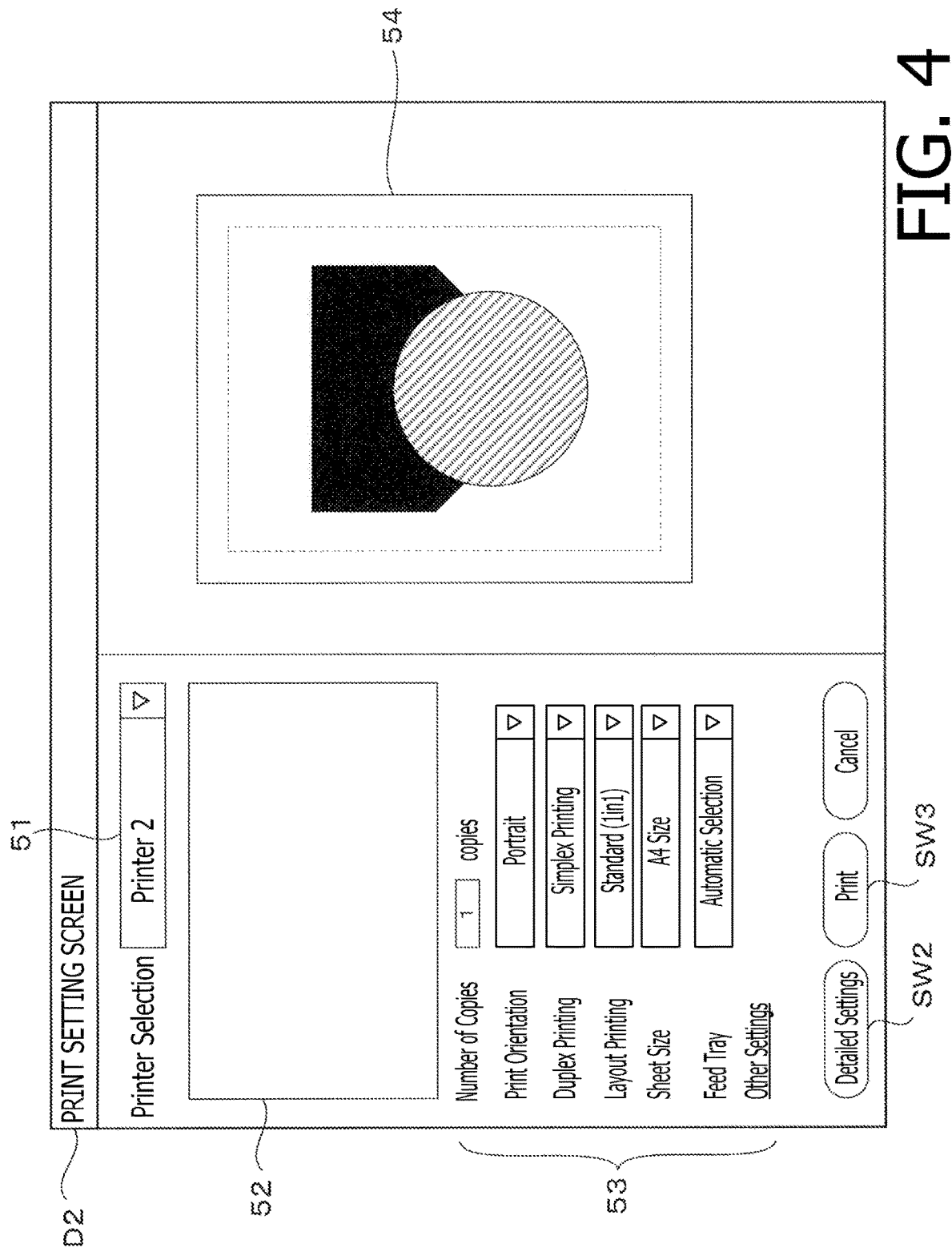
FIG. 4 shows an example of a print setting screen.

The general-purpose printing program 41 displays the print setting screen on the display 13a in response to the display request (A06). The print setting screen is configured to accept an instruction to configure print settings and an instruction to perform printing. For instance, as shown in FIG. 4, a print setting screen D2 includes a printer selection field 51, a notification field 52, a print setting field 53, a preview field 54, a detail setting button SW2, and a print button SW3. The printer selection field 51 is for accepting selection of a printer. The notification field 52 is for displaying a notification image. The print setting field 53 is for accepting designations of various print settings. The preview field 54 is for showing an image of the information screen to be printed. The detail setting button SW2 is for accepting an instruction to configure detailed print settings. The print button SW3 is for accepting an instruction to perform printing.

The print setting field 53 is configured to display print setting items for the functions supported by the general printing program 41 and to accept print setting values set for the print setting items displayed. Examples of items settable via the print setting field 53 may include, but are not limited to, the number of copies, a print orientation, duplex printing, layout printing (Nin1), a sheet size, a feed tray, a print range, a sheet type, color, borderless printing, scaling, and print quality (resolution). In the print setting field 53, to facilitate print settings, only main setting items may be displayed initially, and the other setting items may be additionally displayed in response to operations to "Other Settings" (see FIG. 4).

The notification image displayed in the notification field 52 is an image indicating what is notified to the user. The general-purpose printing program 41 is enabled to handle data for displaying the print setting screen D2.

As shown in FIG. 2, the user is allowed to select a printer by operating the printer selection field 51 on the print setting screen D2 being displayed (A07). When the selected printer is the printer 2, the general-purpose printing program 41 starts the auxiliary program 42 compatible with the printer 2, and makes a request for processing corresponding to the printer selection (A08). In A08, the general-purpose printing program 41 provides the auxiliary program 42 with information on the selected printer and on the print settings at the time of the printer selection.

When the printer 2 is set as a printer usually used in the OS 21, for instance, as shown in FIG. 4, the general-purpose printing program 41 displays the print setting screen D2 with the printer 2 selected (A06) and activates the auxiliary program 42 (A08). Namely, the printer 2 is automatically selected by the OS 21, and the general-purpose printing program 41 executes A08 based on information on the selected printer 2. In this case, the user operation in A07 is unnecessary.

The information applications 43, instead of the general-purpose printing program 41, may display the print setting screen D2. In that case, the information applications 43 may activate the general-purpose printing program 41 in response to "Print" being selected in A03, then obtain data for displaying the print setting screen D2 from the general-purpose printing program 41, and cause the display 13a to display the print setting screen D2 based on the obtained data. Then, the information applications 43 may provide the information on the selected printer 2 to the general-purpose printing program 41, for instance, in response to the printer 2 being selected already even without the user selection in A07 or selected in A07. Thereby, in A08, the general-purpose printing program 41 may activate the auxiliary program 42 compatible with the printer 2.

The auxiliary program 42, in response to being activated, sends a request for capability information of the printer 2 to the OS 21 (A11). In response to receipt of the request from the auxiliary program 42, the OS 21 sends an obtainment request for the capability information to the printer 2, and obtains the capability information from the printer 2 (A12). The OS 21 provides the capability information obtained from the printer 2 to the auxiliary program 42 (A13).

For instance, the OS 21 communicates with the printer 2 via IPP ("IPP" is an abbreviation for "Internet Printing Protocol") communication. It is noted that instead of sending the request to the OS 21, the auxiliary program 42 may obtain the capability information directly from the printer 2, for instance, using MIB ("MIB" is an abbreviation for "Management Information Base").

The capability information obtained from the printer 2 includes information on parameters settable for the print settings. Further, the capability information includes information indicating proper combinations of print settings. Further, the capability information includes, for instance, status information, information on the remaining amount of consumable material, information on the trays attached, sheet information on the sheet set for each tray, and information on settable print resolutions. Further, the printer 2 may be configured to perform image processing based on a received print job and perform printing based on the data after the image processing, for instance, to perform intensive printing (e.g., Nin1), composite printing (e.g., watermarking), and saving printing to save colorant. If the printer 2 has image processing functions executable on the printer 2, the printer 2 may provide information on these functions to the OS2 1 as the capability information.

The auxiliary program 42 stores the capability information obtained from the OS 21 in A13 in a particular area in the memory 12 that is usable by the auxiliary program 42 (A14). When capability information has already been stored in the memory 12, the auxiliary program 42 overwrites the already-stored capability information to store the capability information obtained this time.

The auxiliary program 42 performs an exclusion information obtaining process to obtain exclusion information based on the obtained capability information (A15). The exclusion information indicates improper combinations of print settings. There are improper combinations of print settings. FIGS. 5A and 5B show examples of combinations of print settings that are unable to set together. For instance, as shown in Exclusion No. 1 and Exclusion No. 2 in FIG. 5A, there are sheet types and sheet sizes that are unable to be fed depending on the sheet feeding method (i.e., the feed tray). In addition, as shown in Exclusion No. 3 and Exclusion No. 4 in FIG. 5A, there are cases in which borderless printing and duplex printing are unable to be performed depending on the sheet type or the sheet size. Furthermore, as shown in Exclusion No. 5 in FIG. 5A, there are combinations of printing methods that are unable to be used together due to their natures.

A specific explanation of the exclusion information obtaining process will be provided. The auxiliary program 42 extracts improper combinations of print settings by back-calculating proper combinations of print settings included in the capability information obtained in A13. Then, the extracted improper combinations are described in exclusion list data shown in FIG. 5A. The exclusion list data is stored in a storage area for the auxiliary program 42 in the memory 12. The exclusion list data is described, for instance, in Print Device Capabilities (XML, format file). The exclusion list data may be an example of "exclusion information" according to aspects of the present disclosure. The exclusion information may be the obtained capability information itself.

Suppose for instance that the printer 2 has a tray 1 and a tray 2, and that the printer is enabled to feed glossy paper from the tray 1 but is unable to feed glossy paper from the tray 2. In this case, the obtained capability information includes, as a proper combination of print settings, a setting, in which a setting value "Tray 1" is set for the setting item "Feed Tray" (hereinafter such a setting may be abbreviated as "Feed Tray: Tray 1"), and a setting "Sheet Type: Glossy Paper." On the other hand, the obtained capability information does not include, as a proper combination of print settings, "Feed Tray: Tray 2" and "Sheet Type: Glossy Paper." Accordingly, as shown in Exclusion No. 1 of FIG. 5A, the auxiliary program 42 describes the combination of "Feed Tray: Tray 2" and "Sheet Type: Glossy Paper" as exclusion information in the exclusion list data.

The printer capabilities differ depending on the printer model. The auxiliary program 42 obtains different capability information depending on the model of the selected printer. As a result, different exclusion list data is stored depending on the model of the selected printer.

As shown in FIG. 5B, there are improper combinations of processing options for which the printer 2 is unable to perform image processing and for which the auxiliary program 42 performs image processing. The improper combinations of processing options include a combination of a processing option and a print setting as shown in Exclusion No. 11 and Exclusion No. 13, and a combination of processing options as shown in Exclusion No. 12. Information indicating the improper combinations of processing options, for which the printer 2 is unable to perform image processing and for which the auxiliary program 42 performs image processing, are also stored in the storage area for the auxiliary program 42 in the memory 12.

Referring back to FIG. 2, the auxiliary program 42 performs a notification data generating process based on the capability information obtained in A13 (A21). The notification data generating process is a process to generate notification data indicating a notification image to be displayed in the notification field 52 on the print setting screen D2. The notification image to be displayed in the notification field 52 may include, for instance, a text, a still image, and a video, or may include a combination of at least two selected from a group consisting of texts, still images, and videos. For instance, in the notification data generating process in A21, notification data including a logo of the printer manufacturer and an advertisement may be generated. The notification data may be empty if there is nothing to be displayed in the notification field 52.

In the notification data generating process, the auxiliary program 42 may determine whether the print settings are proper based on the capability information obtained in A13 and the exclusion information obtained in A15, and may generate the notification data according to the determination as to whether the print settings are proper. Since these processes are substantially the same as after-mentioned processes C04, C11, and C12 in FIG. 8, an explanation thereof will be omitted.

Furthermore, the auxiliary program 42 provides the general-purpose printing program 41 with display information including the generated notification data and information on print setting values based on the capability information (A22), and terminates the process of the auxiliary program 42. Based on the display information received from the auxiliary program 42, the general-purpose printing program 41 displays a notification image in the notification field 52 of the print setting screen D2 displayed on the display 13a (A23). In A23, in addition to displaying the notification image based on the notification data in the notification field 52, the general-purpose printing program 41 displays in the print setting field 53 information based on the capability information of the printer 2, as initial values of individual print settings. It is noted that when the information applications 43 are configured to display the print setting screen D2, the information applications 43 execute substantially the same process as A23. Namely, in this case, the information applications 43 receive the notification data and displays the notification image in the notification field 52.

The example in FIG. 4 shows the print setting screen D2 that includes a single notification field 52. However, the location, the shape, the size, and the number of the notification fields 52 are not limited to this example. The auxiliary program 42 may obtain information on the notification field 52 from the general-purpose printing program 41, and may determine, based on the obtained information, the notification data to be displayed in the notification field 52. For instance, if there are a plurality of locations where the notification field 52 may be displayed, and it is possible to specify a display location where the notification field 52 is to be displayed from among the plurality of locations via the auxiliary program 42, the auxiliary program 42 may provide the general-purpose printing program 41 with notification data that includes information specifying the display location. Moreover, if it is possible to select a size of the notification field 52, the auxiliary program 42 may provide the general-purpose printing program 41 with information specifying the selected size of the notification field 52.

Instead of generating notification data and providing the generated notification data to the general-purpose printing program 41, the auxiliary program 42 itself may display the information. However, in this case, a separate screen from the print setting screen D2 would be displayed, and such complicated display might cause stress on the user. Meanwhile, when the information is displayed within the print setting screen D2 of the general-purpose printing program 41 of the OS 21, it is possible to achieve more simplified display and avoid the stress on the user.

Figure 6:
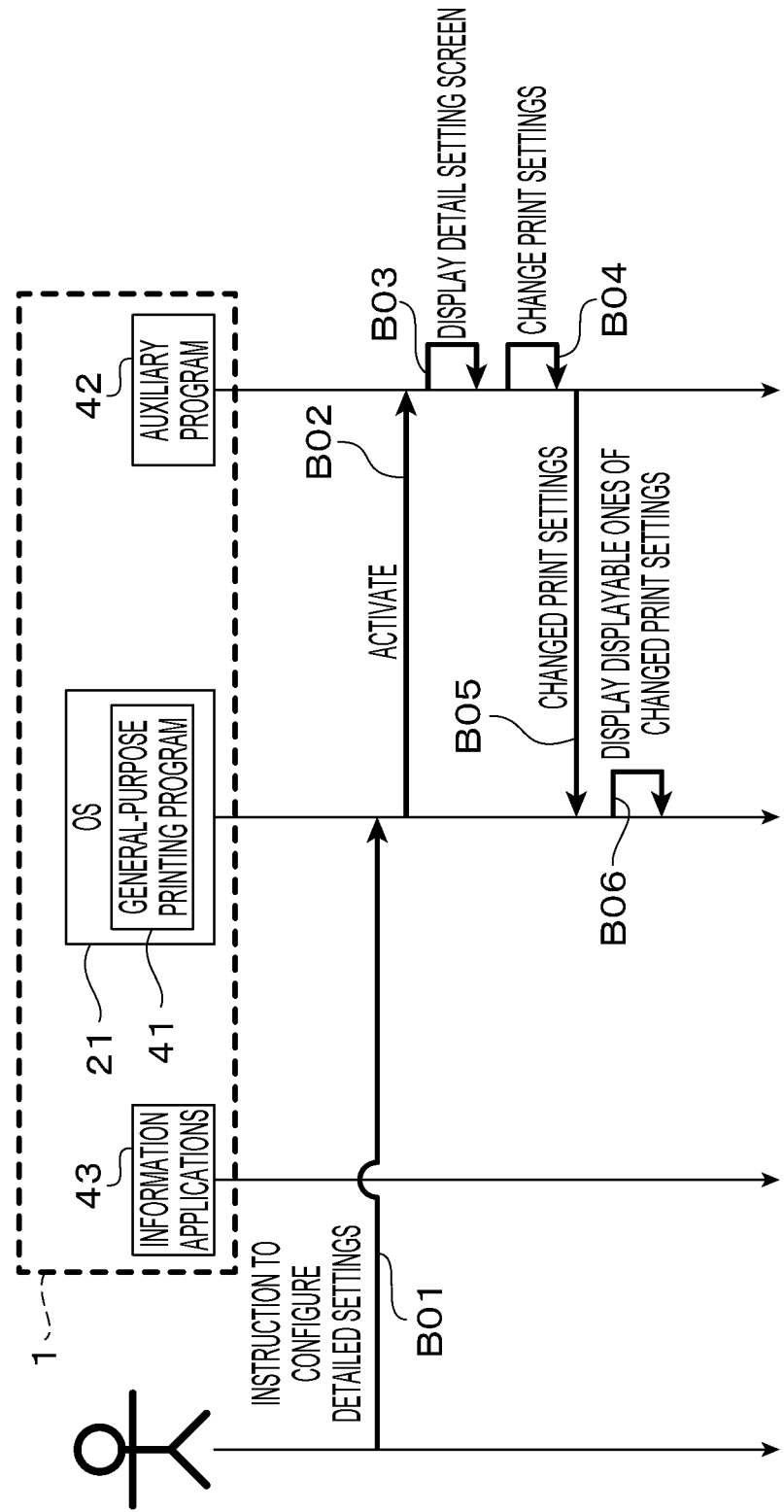
FIG. 6 is a sequence chart showing an example procedure of processes to be performed when "Detailed Settings" is selected.

Next, referring to FIG. 6, an explanation will be provided of a procedure of processes to be performed by the individual programs when the user operates the detail setting button SW2 to provide an instruction to configure the detailed settings while the print setting screen D2 (see FIG. 4) is being displayed.

As shown in a sequence chart in FIG. 6, the general-purpose printing program 41 activates the auxiliary program 42 (B02) based on the user instruction to configure the detailed settings (B01). The general-purpose printing program 41 provides the auxiliary program 42 with the print settings configured in the print setting field 53 on the print setting screen D2, and makes a request for processing to accept the detailed settings to the auxiliary program 42.

For instance, the auxiliary program 42 causes the display 13a to display a detail setting screen D3 shown in FIG. 7. The detail setting screen D3 displays thereon a detail setting field 61 and an apply button SW22 (B03). The detail setting field 61 has various print setting items displayed therein for the functions supported by the auxiliary program 42. In each print setting item, a print setting received from the general-purpose printing program 41 is reflected. The detail setting field 61 is configured to receive print setting values for items (e.g., poster printing, booklet printing, and stapling) that are not settable via the print setting screen D2, in addition to items settable via the print setting screen D2 (see FIG. 4). The detail setting screen D3 is configured to receive setting values for the processing options (e.g., poster printing and booklet printing) that are not included in the capability information of the printer 2. Processing options (e.g., layout printing) to which the general-purpose printing program 41 is adaptable are settable via the print setting screen D2 (see FIG. 4).

In response to receiving an instruction to change the print settings through a user operation to the apply button SW22, the auxiliary program 42 changes the print settings received in B02 using the print settings configured in the detail setting field 61 (B04). The auxiliary program 42 provides the changed print settings to the general-purpose printing program 41 (B05), and terminates the process of the auxiliary program 42. With respect to the items that are not settable via the print setting screen D2, the setting values therefor are stored in a memory area for the auxiliary program 42. The general-purpose printing program 41 displays print settings, which are displayable among the changed print settings received from the auxiliary program 42, in the print setting field 53 on the print setting screen D2 shown in FIG. 4 (B06). It is noted that the auxiliary program 42 is unable to accept an improper combination of print settings. Therefore, the auxiliary program 42 does not generate notification data.

Figure 8:
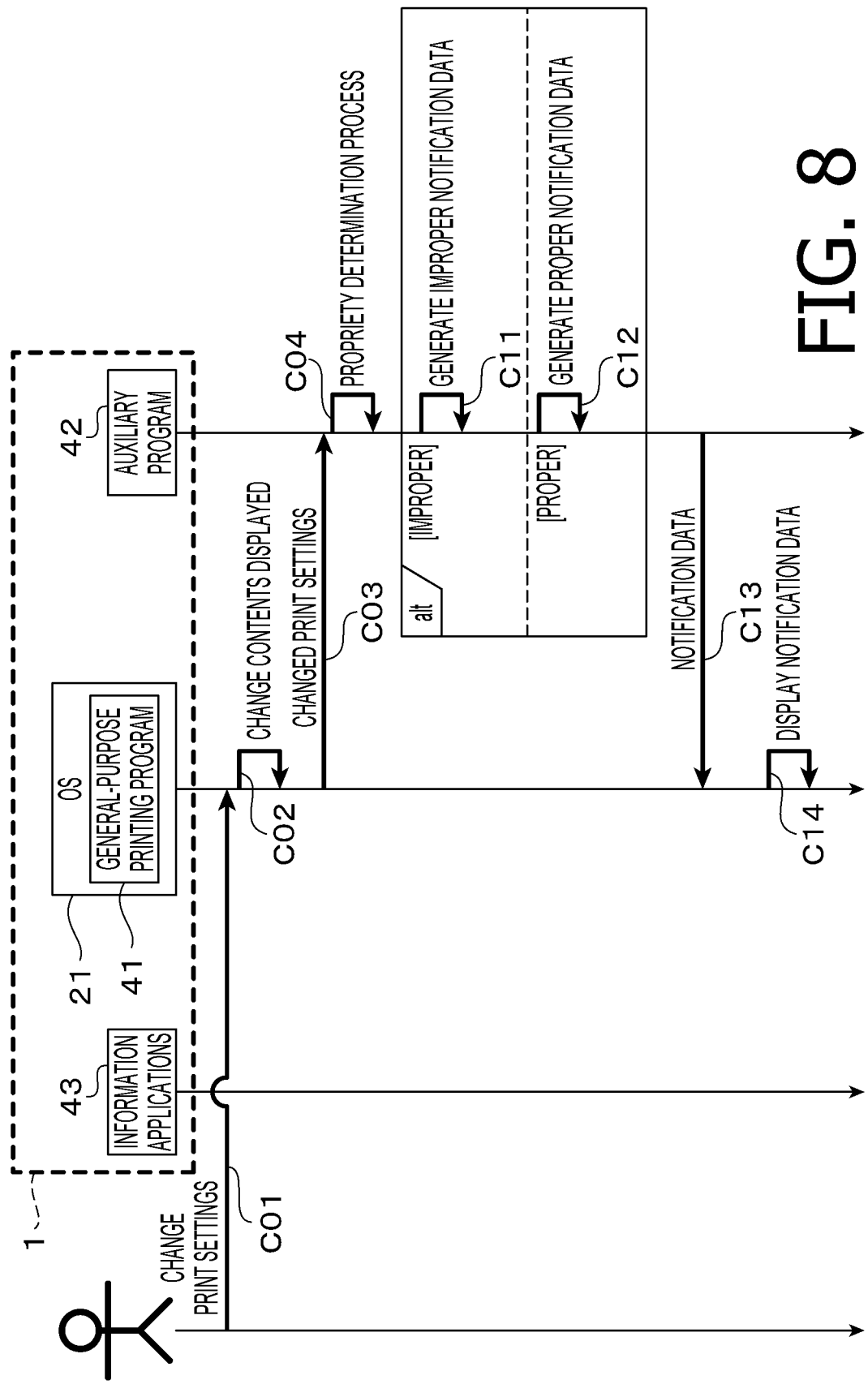
FIG. 8 is a sequence chart showing an example procedure of processes to be performed when the print settings are changed.

Next, referring to a sequence chart in FIG. 8, an explanation will be provided of a procedure of processes to be performed by the individual programs when the user operates the print setting field 53 to provide an instruction to change the print settings while the print setting screen D2 (see FIG. 4) is being displayed. As described above, the print setting screen D2 is configured to receive an instruction to change the print settings through a user operation to the print setting field 53 and to receive an instruction to perform printing through a user operation to the print button SW3.

Based on a user instruction to change the print settings (C01), the general-purpose printing program 41 changes the contents displayed in the print setting field 53 on the print setting screen D2 (C02). Furthermore, when the print settings are changed, the general-purpose printing program 41 activates the auxiliary program 42 and makes a request for processing corresponding to the changed print settings to the auxiliary program 42 (C03). In C03, the auxiliary program 42 receives information on the changed print settings from the general-purpose printing program 41.

The auxiliary program 42 performs a propriety determination process to determine whether the print settings are proper (C04). When determining in the propriety determination process that the print settings are improper (alt: Improper), the auxiliary program 42 generates improper notification data indicating that the print settings are improper (C11). Meanwhile, when determining in the propriety determination process that the print settings are proper (alt: Proper), the auxiliary program 42 generates proper notification data indicating that the print settings are proper (C12). The auxiliary program 42 provides the notification data generated in C11 or C12 to the general-purpose printing program 41 (C13). The general-purpose printing program 41 displays the received notification data in the notification field 52 on the print setting screen D2 (see FIG. 4) (C14). Namely, an image based on the improper notification data generated by the auxiliary program 42 is displayed on the print setting screen D2 that has been activated and displayed from the information applications 43. A specific explanation will be provided of C04 and C11 to C14 with reference to FIGS. 9 and 10.

Figure 9:
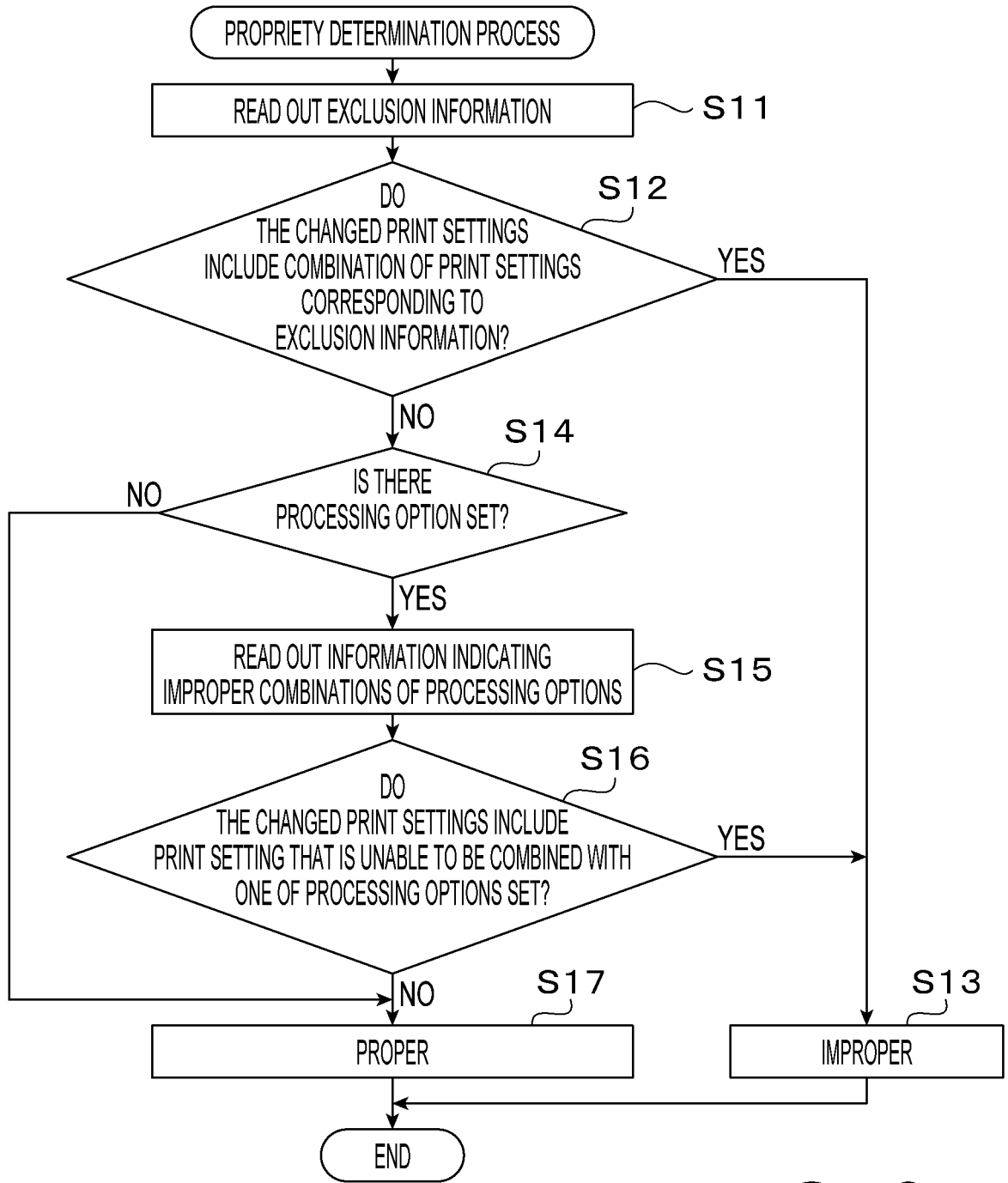
FIG. 9 is a flowchart showing an example procedure of a propriety determination process.

FIG. 9 is a flowchart showing an example of the procedure of the propriety determination process in C04 shown in FIG. 8. The propriety determination process is performed by the CPU 11 of the PC 1 based on the description in the auxiliary program 42.

In the propriety determination process, the CPU 11 first reads out the exclusion information generated in A15 of FIG. 2 from the memory 12 (S11). The CPU 11 checks the changed print settings received in C03 of FIG. 8 against the read-out exclusion information, and determines whether the changed print settings include a combination of print settings corresponding to the exclusion information (S12). Namely, the CPU 11 determines whether the changed print settings include an improper combination of print settings shown in FIG. 5A.

Suppose for instance that the printer 2 is unable to perform duplex printing on an envelope. In this case, suppose for instance that a proper combination of print settings is configured on the print setting screen D2 shown in FIG. 4, with a setting value "A4 size" set for the setting item "Sheet Size," and a setting value "Duplex Printing" set for the setting item "Duplex Printing." In this state, if the sheet size is changed to "Envelope Size" on the print setting screen D2, the combination of "Envelope Size" and "Duplex Printing" will correspond to the improper combination of print settings shown in Exclusion No. 4 in FIG. 5A. In this case, the changed print settings include the combination of print settings corresponding to the exclusion information (S12: Yes). Therefore, the CPU 11 determines that the changed print settings are improper (S13). Afterward, the CPU 11 terminates the process shown in FIG. 9.

As shown in FIG. 8, when determining that the changed print settings are improper based on the exclusion information (alt: Improper), the auxiliary program 42 generates improper notification data indicating that the print settings are improper (C11). For instance, the auxiliary program 42 generates separate notification information for each improper combination of setting values for setting items in the improper print settings, and generates improper notification data including the generated notification information. The improper notification data may include guide information for making the print settings proper. The improper notification data may include an image showing the improper combination of print settings. From the improper notification data, both or either one of the guide information and the still image may be omitted. The improper notification data may include, for instance, a video for making the print settings proper.

The auxiliary program 42 provides the improper notification data generated in C11 to the general-purpose printing program 41 (C13). For instance, as shown in FIG. 10A, the general-purpose printing program 41 displays the improper notification data received from the auxiliary program 42 in the notification field 52 (see FIG. 4) on the print setting screen D2 (C14). In the notification column 52, for instance, notification information M5 is displayed that includes an explanation that "Envelope Size" and "Duplex Printing" are unable to be set together. Further, in the notification field 52, for instance, guide information GM5 is displayed that includes a solution that suggests the user to change the setting "Duplex Printing" to "Simplex Printing" when priority is given to envelope printing, and a solution that suggests the user to change the sheet size to something other than "Envelope Size" when priority is given to duplex printing. Further, in the notification field 52, for instance, an image IM5 is displayed that represents that envelope printing and duplex printing are unable to be used together.

As shown in FIG. 9, when determining that the changed print settings does not include a combination of print settings corresponding to the exclusion information (S12: No), the CPU 11 determines whether there is a processing option set in the auxiliary program 42 (S14). As shown in FIG. 5B, the exclusion information does not include processing options for which the printer 2 is unable to configure settings. The processing options for which the printer 2 is unable to configure settings are unable to be set via the print setting screen D2 (see FIG. 4) and are set via the detail setting screen D3 (see FIG. 7). Therefore, the CPU 11 refers to the memory 12 and determines whether there is a setting for a processing option based on the print settings configured in the auxiliary program 42.

When determining that there is a processing option set in the auxiliary program 42 (S14: Yes), the CPU 11 reads out, from the memory 12, the information indicating the improper combinations of processing options shown in FIG. 5B (S15).

The CPU 11 determines whether the changed print settings include a print setting that is unable to be combined with one of the processing options set in the auxiliary program 42 (S16).

For instance, poster printing, in which the original document is divided and printed on M sheets, requires simplex printing. Suppose for instance that in a state where a radio button corresponding to "Execute" for "Poster Printing" is selected on the detail setting screen D3 shown in FIG. 7, the setting value for "Duplex Printing" is changed from "Simplex Printing" to "Duplex Printing" on the print setting screen D2 shown in FIG. 4. The combination of the changed print settings corresponds to the improper combination of processing options shown in Exclusion No. 13 in FIG. 5B (S16: Yes). Therefore, the CPU 11 determines that the changed print settings are improper (S13). Afterward, the CPU 11 terminates the process shown in FIG. 9.

As shown in FIG. 8, when determining that the changed print settings are improper based on the processing options set in the auxiliary program 42 (alt: Improper), the auxiliary program 42 generates improper notification data indicating that the changed print settings are improper (C11).

The auxiliary program 42 provides the improper notification data generated in C11 to the general-purpose printing program 41 (C13). For instance, as shown in FIG. 10B, the general-purpose printing program 41 displays the improper notification data received from the auxiliary program 42 in the notification field 52 (see FIG. 4) on the print setting screen D2 (C14). In the notification field 52, for instance, notification information M6 is displayed that includes an explanation that "Duplex Printing" and "Poster Printing" are unable to be set together. Further, in the notification field 52, for instance, guide information GM6 is displayed that includes a solution that suggests the user to set "Not Execute" for "Poster Printing" on the detail setting screen when priority is given to duplex printing, and a solution that suggests the user to change the setting for "Duplex Printing" to "Simplex Printing" when priority is given to poster printing. Further, in the notification field 52, for instance, an image IMG is displayed that represents that poster printing is not executable.

In FIG. 10A, instead of the guide information GM5, an object with a link embedded with the URL of a web page displaying the guide information GM5 may be displayed in the notification field 52. Likewise, in FIG. 10B, instead of the guide information GM6, an object with a link embedded with the URL of a web page displaying the guide information GM6 may be displayed in the notification field 52.

As shown in FIG. 9, when determining that the changed print settings do not include a print setting that is unable to be combined with one of the processing options set in the auxiliary program 42 (S16: No), the CPU 11 determines that the changed print settings are proper (S17). Afterward, the CPU 11 terminates the process shown in FIG. 9.

As shown in FIG. 8, when determining that the changed print settings are proper (alt: Proper), the auxiliary program 42 generates proper notification data indicating that the changed print settings are proper (C12).

The auxiliary program 42 provides the generated proper notification data to the general-purpose printing program 41 (C13). The general-purpose printing program 41 displays the proper notification data received from the auxiliary program 42 in the notification field 52 on the print setting screen D2 (C14). As shown in FIG. 10C, in the notification field 52, for instance, notification information M11 is displayed that indicates that the print settings are proper. Further, in the notification field 52, for instance, an image IM11 is displayed that represents that the print settings are proper.

As shown in FIG. 9, when the changed print setting does not include an improper combination of print settings corresponding to the exclusion information (S12: No), and there is no processing option set in the auxiliary program 42 (S14: No), the CPU 11 determines that the changed print setting is proper (S17). Thereafter, the CPU 11 terminates the process shown in FIG. 9. In this case, the processes of C12 to C14 shown in FIG. 8 are performed in substantially the same manner as described above to display in the notification field 52 the notification data indicating that the changed print settings are proper.

Next, referring to a sequence chart shown in FIG. 11, an explanation will be provided of a procedure of processes by the individual programs when a print instruction through a user operation to the print button SW3 is received while the print setting screen D2 (see FIG. 4) is being displayed. The user's print instruction to execute printing may be input directly into the general-purpose printing program 41, or may be input into the information applications 43 and then output from the information applications 43 to the general-purpose printing program 41.

When having received the user's print instruction (D01), the general-purpose printing program 41 generates intermediate image data by converting the format of image data representing a target image to be printed into a format for the intermediate image data using the print settings accepted via the print settings screen D2 (D02), and then provides the generated intermediate image data to the auxiliary program 42 (D03). Various types of image data are included in the information applications 43. The general-purpose printing program 41 converts the image data to be printed into the intermediate image data suitable for generation of print data. If the image data to be printed is suitable for generation of print data, the generation of the intermediate image data may be omitted, and the image data to be printed may be used as is as the intermediate image data. The intermediate image data is, for instance, XPS ("XPS" is an abbreviation for "XML Paper Specification") data.

The auxiliary program 42 reflects the print settings configured in the auxiliary program 42 in the intermediate image data received in D03 and processes the intermediate image data (D04). For instance, when poster printing (1 in 2×2) is set, the auxiliary program 42 divides the image data to be printed into two parts in the vertical and horizontal directions and generates divisional image data.

The auxiliary program 42 rasterizes the processed intermediate image data and generates print data representing the target image to be printed (D05). The print data generated in D05 is data in a format usable for printing by the printer 2. For instance, the print data generated in D05 is PDL data dedicated to the model of the printer 2.

The auxiliary program 42 compatible with the printer 2 is enabled to perform the rasterization with a higher degree of freedom than the general-purpose printing program 41. Therefore, it is more likely that print data suitable for printing with the printer 2 will be generated through the rasterization by the auxiliary program 42. The print data generated by the auxiliary program 42 may be in a format usable for printing with printers other than the model of the printer 2.

The auxiliary program 42 transmits the print data generated in D05 to the printer 2 together with a print command to instruct the printer 2 to perform printing (D06). If there is image processing determined to be executed by the printer 2, the auxiliary program 42 may generate a print command including information regarding the image processing. Further, the auxiliary program 42 may provide a notification that the transmission of the print data has been completed to the general-purpose printing program 41 (D08).

The printer 2, which has received the print data and the print command, performs printing of the image represented by the print data based on the received print command (D07). Thus, a printed material is generated.

Instead of the auxiliary program 42 generating the print data, the general-purpose printing program 41 may generate the print data. For instance, the auxiliary program 42 may provide the intermediate image data processed in D03 and information regarding execution of printing to the general-purpose printing program 41, and the general-purpose printing program 41 may rasterize the intermediate image data and generate the print data. In this case, the general-purpose printing program 41 may provide the generated print data to the auxiliary program 42. In response to receiving the print data from the general-purpose printing program 41, the auxiliary program 42 may transmit the print data received from the general-purpose printing program 41 to the printer 2 together with a print command to instruct the printer 2 to perform printing.

The print data generated by the general-purpose printing program 41 is print data (e.g., PWG-Raster data or PDF data) in a format usable for printing by various types of printers. The rasterization by the general-purpose printing program 41 makes it possible to reduce throughput of the auxiliary program 42, thereby avoiding an increase in processing time, and to reduce a program size of the auxiliary program 42.

The general-purpose printing program 41 may transmit the print data and the print command to the printer 2. Namely, the auxiliary program 42 may provide the generated print data to the general-purpose printing program 41 in such a manner that the print data is transmitted from the PC 1 to the printer 2 as a destination. In this case, the general-purpose printing program 41 may transmit the print data received from the auxiliary program 42 to the printer 2.

As described above, the auxiliary program 42 of the illustrative embodiment obtains the capability information of the printer 2. Then, when the print settings have been changed, and the changed print settings are determined to be improper based on the obtained capability information, the auxiliary program 42 provides the general-purpose printing program 41 with notification data indicating that the print settings are improper, thereby enabling the general-purpose printing program 41 to display the notification data in the notification field 52 on the print setting screen D2. Thus, the PC 1 using the general-purpose printing program 41 of the OS 21 is enabled to provide a notification that the print settings are improper. As a result, the user is allowed to know information about whether the print settings are configurable, thereby increasing a possibility of avoiding an unintended printed result.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

For instance, the device connected with the PC 1 is not limited to the printer, but may be any device with a printing function, such as a multi-function peripheral, a copier, or a fax machine. The number of printers connected with the PC 1 is not limited to one as illustrated, but may be two or more.

For instance, the respective notification images in FIGS. 10A to 10C are all just examples, and are not limited to the examples as illustrated.

The time when the capability information is obtained is not limited to the time (i.e., A07 to A13 in FIG. 2) when the printer is selected via the print setting screen D2, but may be the time when the auxiliary program 42 is installed or may be each time the print settings are changed. In this case as well, the auxiliary program 42 may store in the memory 12 information based on the obtained capability information (which may be the capability information itself or, for instance, information on a list of settings to be excluded that is generated based on the capability information), and may use the stored information in the propriety determination process (C04 in FIG. 8).

For instance, in the aforementioned illustrative embodiment, as shown in FIGS. 10A and 10B, for each improper combination of setting values for setting items in the improper print settings, separate notification data is generated, and a separate notification image is displayed in the notification field 52. In contrast, if the print settings are improper, for all the improper combinations of setting values for setting items in the improper print settings, the same notification data may be generated, and the same notification image may be displayed in the notification field 52. However, as shown in FIGS. 10A and 10B, when separate different notification information, separate guide information, and a separate image are displayed for each improper combination of setting values for setting items in the improper print settings, the user is allowed to more easily understand which setting items are improper.

The guide information GM5 and GM6 shown in FIGS. 10A and 10B, respectively, may not be displayed. However, when the print settings are improper, displaying guide information for making proper the print settings in the notification field 52 makes it easier for the user to change the print settings to proper print settings.

When the print settings are proper, the processes of C12 to C14 in FIG. 8 may not be performed, thereby not displaying the proper notification data in the notification field 52. In this case, in the notification field 52, information different from the propriety of the print settings may be displayed such as a printer manufacturer's logo mark or advertisement. According to this, it is possible to avoid the stress on the user by reducing annoying operations of the display being switched each time the print settings are properly changed. However, as in the aforementioned illustrative embodiment, when the print settings are proper, by displaying the notification data indicating that the print settings are proper, the user is allowed to know the information about whether the print settings are configurable, via the PC 1 that uses the general-purpose printing program 41 of the OS 21.

The processes of S14 to S16 in FIG. 9 may be omitted. However, when the changed print settings are determined to be improper in the state where processing options to process the target image to be printed are set via the auxiliary program 42, by providing the general-purpose printing program 41 with the notification data indicating that the print settings are improper and displaying the notification data in the notification field 52 on the print setting screen D2, the user is allowed to know the information about the propriety of the print settings based on the processing options, via the PC 1 that uses the general-purpose printing program 41 of the OS 21.

The capability information may be obtained acquired at the time of changing the print settings, and the exclusion information based on the obtained capability information may be generated. However, when the exclusion information is generated at the time of selecting the printer, it is possible to make shorter the time required to determine whether the print settings are configurable than when the capability information is obtained acquired at the time of changing the print settings and the exclusion information based on the obtained capability information is generated.

The general-purpose printing program 41 may activate the auxiliary program 42 when the printer normally used is changed from another printer to the printer 2 via the OS 21 by a user operation after the print setting screen D2 is displayed by the general-purpose printing program 41. In this case as well, in substantially the same manner as when the printer 2 is selected, the auxiliary program 42 may perform the notification data generating process and provide the generated notification data to the general-purpose printing program 41.

In the aforementioned illustrative embodiment, only the printing operation has been described in detail as an operation by the auxiliary program 42. However, the auxiliary program 42 may have other additional roles. The program that executes the processes according to aspects of the present disclosure is not limited to the auxiliary program 42, but may be any program configured to receive an instruction from the OS 21 or the general-purpose printing program 41 when printing is performed using the general-purpose printing program 41. For instance, the program that executes the processes according to aspects of the present disclosure may be a print workflow application of which the specifications have been published by Microsoft Corporation.

The timing at which the auxiliary program 42 is executed is not limited to the example in the aforementioned illustrative embodiment. For instance, the auxiliary program 42 may be executed by a direct execution instruction from the OS 21, or may be a resident auxiliary program 42. When the auxiliary program 42 is resident, the auxiliary program 42 may perform the aforementioned operations in response to receipt of an execution instruction.

In an arbitrary flowchart disclosed in the aforementioned illustrative embodiment, a plurality of processes in any plurality of steps may be arbitrarily changed in execution order or may be executed in parallel, to such an extent that there is no inconsistency in the processing results.

The processes disclosed in the aforementioned illustrative embodiment may be performed by a single CPU, a plurality of CPUs, hardware such as an ASIC, or a combination thereof. The processes disclosed in the aforementioned illustrative embodiment may be achieved in various forms and aspects such as a method and a non-transitory computer-readable storage medium storing programs for performing the processes.

The following shows examples of associations between elements illustrated in the aforementioned illustrative embodiment(s) and modification(s), and elements claimed according to aspects of the present disclosure. For instance, the PC 1 may be an example of an "information processing device" according to aspects of the present disclosure. The CPU 11 may be an example of a "processor" according to aspects of the present disclosure. The memory 12 may be an example of a "non-transitory computer-readable storage medium" according to aspects of the present disclosure. The memory 12 may be an example of a "memory" according to aspects of the present disclosure. The printer 2 may be an example of a "printer" according to aspects of the present disclosure. The display 13a may be an example of a "display" according to aspects of the present disclosure. The auxiliary program 42 may be an example of "computer-readable instructions" according to aspects of the present disclosure. The auxiliary program 42 may be an example of a "support program" according to aspects of the present disclosure. The general-purpose printing program 41 may be an example of a "general-purpose printing program" according to aspects of the present disclosure. The information applications 43 may be an example of an "application program" according to aspects of the present disclosure. The improper notification data generated in C11 of FIG. 8 may be an example of "first notification data" according to aspects of the present disclosure. The proper notification data generated in C12 of FIG. 8 may be an example of "second notification data" according to aspects of the present disclosure. The improper notification data generated in C11 of FIG. 8 may be an example of "third notification data" according to aspects of the present disclosure.

What is claimed is:

1. A non-transitory computer-readable storage medium storing computer-readable instructions that are executable by a processor of an information processing device and compatible with a printer connected with the information processing device, the instructions supporting a general-purpose printing program incorporated in advance in an operating system of the information processing device, the instructions being configured to, when executed by the processor, cause the information processing device to perform:
    obtaining capability information indicating capabilities of the printer;
    in response to a request from the general-purpose printing program after print settings are changed via a print setting screen displayed on a display of the information processing device, obtaining the changed print settings, and determining whether the obtained print settings are proper based on the obtained capability information, the general-purpose printing program being configured to handle data for displaying the print setting screen on the display;
    in response to determining that the obtained print settings include improper settings, generating first notification data indicating that the print settings are improper; and
    providing the generated first notification data to the general-purpose printing program, thereby enabling the first notification data to be displayed on the print setting screen.

2. The non-transitory computer-readable storage medium according to claim 1,
    wherein the instructions are further configured to, when executed by the processor, cause the information processing device to generate, in the generating, the first notification data corresponding to setting values for setting items of the improper settings.

3. The non-transitory computer-readable storage medium according to claim 2,
    wherein the instructions are further configured to, when executed by the processor, cause the information processing device to generate, in the generating, the first notification data including guide information for making the improper settings proper, the guide information corresponding to the setting values for the setting items of the improper settings.

4. The non-transitory computer-readable storage medium according to claim 1,
wherein the instructions are further configured to, when executed by the processor, cause the information processing device to perform, in response to determining, in the determining, that the obtained print settings are proper, neither the generating nor the providing of the notification data about whether the print settings are proper, thereby not enabling information about whether the print settings are proper to be displayed on the print setting screen.

5. The non-transitory computer-readable storage medium according to claim 1,
wherein the instructions are further configured to, when executed by the processor, cause the information processing device to perform:
in response to determining, in the determining, that the obtained print settings are proper, generating second notification data indicating that the print settings are proper; and
providing the generated second notification data to the general-purpose printing program, thereby enabling the second notification data to be displayed on the print setting screen.

6. The non-transitory computer-readable storage medium according to claim 1,
wherein the instructions are further configured to, when executed by the processor, cause the information processing device to perform:
setting a processing option to process a target image to be printed;
when a print instruction to cause the printer to print the target image is provided to the general-purpose printing program in a state where the processing option is set in the setting, obtaining image data representing the target image to be printed from the general-purpose printing program, and generating processed data that represents a processed image resulting from processing the target image;
in response to a request from the general-purpose printing program after the print settings are changed via the print setting screen in the state where the processing option is set in the setting, obtaining the changed print settings, and determining whether the obtained print settings are proper based on the set processing option;
in response to determining that the obtained print settings include improper settings, generating third notification data indicating that the print settings are improper; and
providing the generated third notification data to the general-purpose printing program, thereby enabling the third notification data to be displayed on the print setting screen.

7. The non-transitory computer-readable storage medium according to claim 1,
wherein setting items configurable via the print setting screen include printer selection, and
wherein the instructions are further configured to, when executed by the processor, cause the information processing device to:
in response to a request from the general-purpose printing program after the printer is selected, perform the obtaining of the capability information, and storing exclusion information based on the obtained capability information in a memory; and
perform, in the determining, reading out the exclusion information stored in the memory, and determining whether the obtained print settings are proper based on the read exclusion information.

8. The non-transitory computer-readable storage medium according to claim 1,
wherein the instructions are further configured to, when executed by the processor, cause the information processing device to perform, in response to a request from the general-purpose printing program after a print instruction to print a target image is output from an application program incorporated in the information processing device to the general-purpose printing program, obtaining image data representing the target image from the general-purpose printing program, and sending to the printer a print command based on the obtained image data.

9. A method implementable on a processor of an information processing device that executes a support program supporting a general-purpose printing program incorporated in advance in an operating system of the information processing device, the support program being compatible with a printer connected with the information processing device, the method comprising:
obtaining capability information indicating capabilities of the printer;
in response to a request from the general-purpose printing program after print settings are changed via a print setting screen displayed on a display of the information processing device, obtaining the changed print settings, and determining whether the obtained print settings are proper based on the obtained capability information, the general-purpose printing program being configured to handle data for displaying the print setting screen on the display;
in response to determining that the obtained print settings include improper settings, generating first notification data indicating that the print settings are improper; and
providing the generated first notification data to the general-purpose printing program, thereby enabling the first notification data to be displayed on the print setting screen.

* * * * *